United States Patent [19]

Kim

[11] Patent Number: 5,852,432
[45] Date of Patent: Dec. 22, 1998

[54] FUNCTION DISPLAY CONTROLLING METHOD FOR A COMPOSITE APPARATUS OF CDG PLAYER AND VCR AND APPARATUS THEREOF

[75] Inventor: Jae-Hoon Kim, Seoul, Rep. of Korea

[73] Assignee: Daewoo Electronics Co., Ltd., Seoul, Rep. of Korea

[21] Appl. No.: 548,551

[22] Filed: Oct. 26, 1995

[30] Foreign Application Priority Data

Oct. 26, 1994 [KR] Rep. of Korea ............ 1994 27350
Oct. 26, 1994 [KR] Rep. of Korea ............ 1994 27344

[51] Int. Cl.⁶ ............................................. G01D 15/06
[52] U.S. Cl. ................. 345/156; 345/47; 345/75; 395/116; 395/725
[58] Field of Search ............... 345/156, 44, 146, 345/328, 47, 33, 34, 35, 75; 395/725, 116, 118, 838

[56] References Cited

U.S. PATENT DOCUMENTS

5,414,859  5/1995  Staudacher et al. ............ 395/725
5,485,554  1/1996  Lowitz et al. .................... 395/116
5,530,900  6/1996  Sterling .......................... 395/838

Primary Examiner—Jeffrey A. Hofsass
Assistant Examiner—Davetta Woods
Attorney, Agent, or Firm—Fish & Richardson P.C.

[57] ABSTRACT

A function display controlling method and apparatus for a composite apparatus of a compact disc graphics (CDG) player and of a video cassette recorder (VCR) for displaying on a single fluorescent display panel. The control functions are divided into three groups of the CDG player exclusive function, an exclusive function of the VCR and a function common to both the CDG player and the VCR. The functions selected or currently being executed in the composite apparatus of the CDG player and the VCR are recognized by a controller, and because the CDG player exclusive function, the exclusive function of VCR and the function common to both the CDG player and the VCR, which are stored in a function control input section, are read out in accordance with the operation size, the current operation state is displayed on a fluorescent display panel. Therefore, the fluorescent display panels in the composite apparatus of the CDG player and the VCR are simplified, and the operative functions are clearly displayed.

4 Claims, 5 Drawing Sheets

FUNCTION DISPLAY CONTROLLING METHOD FOR A COMPOSITE APPARATUS OF CDG PLAYER AND VCR AND APPARATUS THEREOF

BACKGROUND OF THE INVENTION

The present invention relates to a function display controlling method for a composite apparatus of a compact disc graphics (CDG) player and a video cassette recorder (VCR) and a function display controlling apparatus for carrying out the same. More particularly, the present invention relates to a function display controlling method for a composite apparatus of a CDG player and a VCR and an apparatus thereof, in which the control functions performed by the composite apparatus of incorporated CDG player and VCR are divided into the exclusive function of CDG player, the exclusive function of VCR and the common function of both the CDG player and the VCR which are displayed on a single fluorescent display panel and an function display controlling apparatus for carrying out the same.

Currently, in the area of optical discs, compact discs are widely used as information recording media in which a large quantity of audio information is recorded. Since a compact disc has a structure that recorded data is optically detected which will then be reproduced, it can be reproduced at random positions. Hi-fi playback characteristics are always uniform irrespective of the playback number of a disc.

The data recorded onto the compact disc contains a synchronizing signal. A block ranging from this synchronizing signal to the subsequent synchronizing signal is defined as a frame. Each frame has a sub-code containing control information and various kinds of service information starting from the frame synchronizing signal indicating the lead of the frame, and has subsequent audio signals and error correction signals. The sub-code contains eight channels of P, Q, R, S, T, U, V and W. Currently, a compact disc digital audio generally uses only P and Q channels to indicate the song number, index number, playback time of a song, accumulating time from the start of a program, and the presence or absence of an audio signal, etc.

By using the compact disc digital audio format as it is, a CDG discs wherein a standstill picture data (graphic data) is recorded on R through W channels of the sub-code and developing a CDG player for reproducing the CDG. A Hi-Fi audio signal equivalent with the compact disc digital audio can be obtained.

Also, since graphic background screen and caption are simultaneously displayed by means of a display device such as a television screen or monitor, the customers' desire concerning the combination of an audio apparatus and a video apparatus can be satisfied.

Recently, an audio/video apparatus combining the audio and video apparatus has been developed, by which the operations of each apparatus are collectively performed, thereby allowing better playback operations of both audio and video signals. In reply to such a trend, there have been much research conducted to develop a composite product of a VCR and CDG player, which allows motion pictures and audio signals to be simultaneously supplied. By means of a single control input section, the composite apparatus can easily control the recording operation of a television broadcasting signal using a video tape and tuner, the recording operation of an externally input signal, e.g., a signal input from a camcorder the CDG playback operation, or the recording operations of picture and audio signals reproduced from CDG player.

The composite apparatus of CDG player and VCR requires a fixed simplified fluorescent display panel so that operations to be performed or newly selected can be easily displayed.

SUMMARY OF THE INVENTION

Therefore, a first object of the present invention is to provide a function display controlling method for clearly displaying the functions selected or currently executed in the composite apparatus of CDG player and VCR, by dividing these functions into the exclusive functions of CDG player, the common functions of CDG player and VCR, and the exclusive functions of CDG player.

A second object of the present invention is to provide a function display controlling apparatus for clearly displaying the functions selected or currently executed in the composite apparatus of CDG player and VCR, by dividing these functions into the exclusive functions of CDG player, the common functions of CDG player and VCR, and the exclusive functions of CDG player.

In order to achieve the above-mentioned first object of the present invention, there is provided a method for controlling function displays in a combined device of a compact disk graphics player and a video cassette recorder, which comprises the steps of:

determining a kind of a designated device as an object to be controlled presently by a function control input signal from a function control input section, which provides input signals to control functions which have been set to the combined device of the compact disc graphics player and the video cassette recorder;

generating display data for driving a fluorescent display panel part, which controls a function display of a corresponding device, by judging an operational state of the determined device; and displaying a controlled content of a corresponding function on the fluorescent display panel part by applying the generated display data to a driving part of the fluorescent display panel.

Preferably, the displaying step comprises the substeps of: judging whether the corresponding function is exclusively used for the compact disc graphics player or for the video cassette recorder, and then reading out the display data, memorized in a storing part of control data, for the exclusive used function, in order to display the control data when the corresponding function is for exclusive use; and judging whether the corresponding function is used for both the compact disc graphics player and the video cassette recorder, and then reading out the display data, which are memorized in the storing part of control data, for the commonly used function in order to display the control data when the corresponding function is for common use. The function display data exclusively used for the compact disc graphics player, the function display data exclusively used for the video cassette recorder, and the function display data used both the compact disc graphics player and the video cassette recorder, are separately stored in the storing part of the control data.

In order to accomplish the above second object of the present invention, there is provided an apparatus for controlling function displays in a combined device of a compact disc graphics player and a video cassette recorder, the apparatus comprising:

a function control inputting section for outputting function control input signals which are playing, and for inputting signals by operating operator's buttons through a front control panel of the function control inputting section;

a controlling section for outputting a first, a second and a third signals, and a function control signal/switching signal by judging a corresponding playing device to the function control input signals provided by the function control inputting portion;

a compact disc graphics player for outputting a composite image on a monitor and for reproducing an audio signal by reading out data recorded on a compact disc graphics through a light controlled by the control section in response to an input signal for reproducing a compact disc graphics, the input signal being provided by the function control inputting section;

a video cassette recorder either for reproducing the audio signal while outputting a composite image signal on the monitor by reading out video/audio data recorded on a video tape under the control of the controlling section in response to signals for VCR playing and recording inputting signals provided by the function control input section, or for recording either television image signals from a tuning section or composite image signals inputted from external inputting terminals on the video tape;

a control data storing section for storing a first, a second and a third function display data which are read by the first control signal provided by the control section;

a program switching section for forming output paths of first exclusive function display data exclusively used by the compact disc graphics player, second common function display data commonly used both by the compact disc graphics player and by the video cassette recorder, and third function display data exclusively used by the video cassette recorder, which are stored in the control data storing section by the third control signal from the control section, and for outputting a first, a second and a third program switching signals corresponding to each of the function display data, the program switching section including a first, a second and a third program switches;

an on-screen-display data storing section for storing on-screen-display data;

an on-screen-display processing section for outputting an on-screen-display processing signal as a video outputting signal on a monitor by inputting a first signal among the first, the second and the third program switching signals from the program switching section, the second control signal from the control section and a video signal from a video switching outputting section;

a fluorescent display panel driving section for outputting a fluorescent display panel driving signal by inputting a second signal among the first, the second and the third program switching signals from the program switching section and the second control signal from the control portion; and a fluorescent display panel section for displaying presently operating functions by inputting the fluorescent display panel driving signal from the fluorescent display panel driving section.

Preferably, the control data storing section portion comprises: a first region wherein the first function display data exclusively used by the compact disc graphics player are recorded; a second region wherein the second common function display data commonly used by both the compact disc graphics player and the video cassette recorder are recorded; and a third region wherein the third function display data exclusively used by the video cassette recorder are recorded.

In a function display controlling method and apparatus for a composite apparatus of a CDG player and of a VCR, the functions selected or currently being executed in the composite apparatus of CDG player and VCR are recognized by a controller. Because the CDG player exclusive function, the exclusive function of VCR and the function common to both a CDG player and a VCR, which are stored in a function control input section, are read out in accordance with the operation state, the current operation state is displayed on a fluorescent display panel. Therefore, the fluorescent display panels in the composite apparatus of a CDG player and of a VCR are simplified, and operative functions are clearly displayed.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

A description will be given below in detail, with reference to the accompanying drawings, of the mechanical structure, the circuitry configuration, and the operation of a function display controlling method for a composite apparatus of both a CDG player and a VCR and an apparatus thereof according to an embodiment of the present invention.

Figure 1:
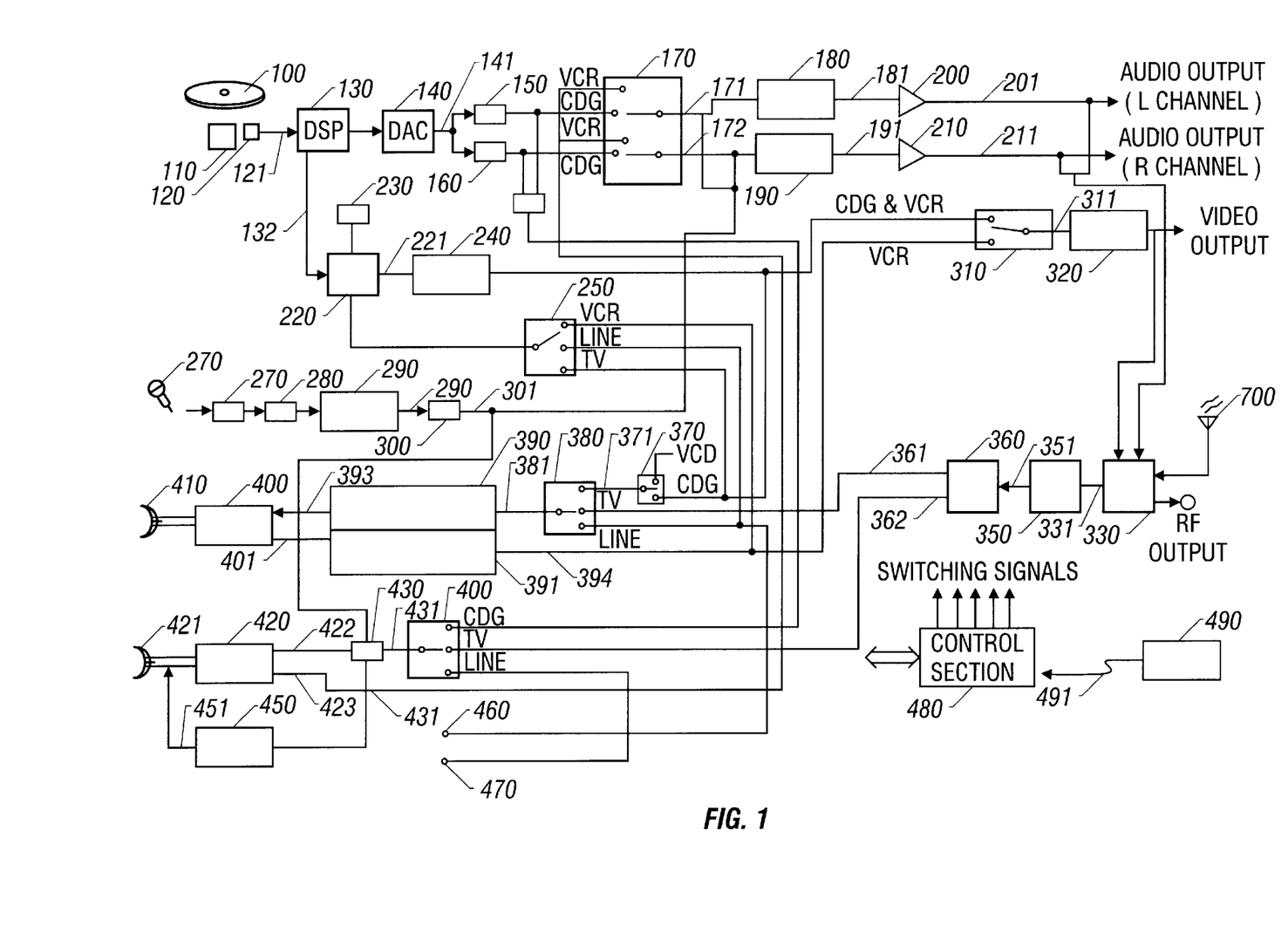
FIG. 1 is a circuitry diagram for showing the configuration of a composite apparatus of an optical disc player and VCR according to the present invention.

FIG. 1 is a circuitry diagram for showing the configuration of a composite apparatus of an optical disc player and a VCR according to the present invention. As shown in FIG. 1, a reference numeral 100 represents a CDG disc which is reproduced by a CDG player. A spindle motor 110 rotates CDG disc 100 at a constant speed under the control operation of a control section 480 to be described later, so that CDG disc 100 is reproduced normally. An optical pickup device 120 reads out information from CDG disc 100 which is rotated at a constant speed. A digital signal processing section (DSP) 130 digitally processes the information 121 read out from CDG disc 100 by an optical pickup device 120. A data conversion section (DAC) 140 converts the information digitally processed by digital signal processing section 130 into a data converted signal 141 corresponding to an analog signal. A first and a second low-pass filter 150 and 160 low-pass-filter the audio signals of the information which has been converted into an analog signal by a data conversion section 140, for channels L and R. A first audio switching section 170 selectively outputs audio signals of the channels L and R, low-pass-filtered by first and second filters 150 and 160, under the control operation of a control section 480 to be described later. A first and a second mixing section 180 and 190 mix audio switched signals 171 and 172 supplied by first audio switching section 170 for the channels L and R, with a singer's singing voice signal inputted, for example, during his practicing video-songs. A first and a second buffer 200 and 210 buffer a first and a second mixed signal 181 and 191 supplied from first and second mixing sections 180 and 190 to supply audio output signals 201 and 211 for the channels L and R.

A CDG decoder 220 decodes a sub-code contained in second digitally processed signal 132 supplied from digital signal processing section 130. A first memory section 230 temporarily stores a decoded CDG data 221 supplied from CDG decoder 220. A RGB encoder 240 encodes the decoded CDG data 221 supplied from CDG decoder 220 into a composite video signals (CDG+VCR) of RGB for a screen display.

A first video switching output section 250 selectively applies the video signals which are applied from external video signal sources by the switching operation of CDG decoder 220 under the control operation of control section 480. The apparatuses for supplying the external video signal sources include a television, and a VCR or a video compact disc player (a line video signal source). A microphone 260 inputs a singer's singing voice signal while he/she practices video-songs. A third low-pass filter 270 low-pass-filters the singer's singing voice signal applied to microphone 260 to eliminate noise components. A first amplifying section 280 amplifies the singer's singing voice signal passing through third low-pass filter 270. An echo processing section 290 echo-processes a first amplified signal 281 supplied from first amplifying section 280. A second amplifying section 300 amplifies an echo-processed signal 291 supplied from echo processing section 290 and outputs a second amplified signal 301 which is applied to first and second mixing sections 180 and 190. A second video switching output section 310 switches a superimposed signal (CDG+VCR) which is obtained by superimposing a graphic signal supplied from CDG player and a video signal supplied from VCR, or a video signal (VCR) from a VCR under the control operation of control section 480, to output a second video switching output signal 311. An OSD processing section 320 OSD-processes character information, under the control operation of control section 480, to insert the OSD-processed information to a video switching output signal 311 supplied from second video switching output section 310.

The signal processing procedure of a VCR playback apparatus will be described as follows. A RF modulating section 330 modulates a television signal received via an antenna 700 and outputs a RF modulated signal 331. A first terminal section 340 applies RF modulated signal 331 supplied from RF modulating section 330 to an apparatus for processing a video signal, such as a television receiver. A tuning section 350 executes tuning for a specific channel with respect to the RF modulated signal 331 supplied from RF modulating section 330 under the control operation of control section 480 and outputs a tuned signal 351. An IF modulating section 360 IF-modulates and detects tuned signal 351 supplied from tuning section 350 and outputs a first and a second IF modulated signal 361 and 362. A third video switching output section 370 switches over between graphic data (CDG) supplied from CDG player and video signal (VCD) read out from a video compact disc (not shown) and outputs a third video switched output signal 371. A fourth video switching output section 380 switches either the third video switched output signal 371 supplied from third video switching output section 370, or the first IF modulated signal (television video signal) 361 supplied from IF modulating section 360, or the line video signal (LINE) supplied from first external terminal 460, under the control operation of control section 480, to output a fourth video switching output sectioned output signal 381.

A video processing section 390 consists of a telerecording processing section 391 and a playback processing section 392. Telerecording processing section 391 processes the fourth video switched output signal 381 supplied from fourth video switching output section 380 and outputs a telerecording-processed signal 393 in order to telerecord the telerecording-processed signal 393 on a VCR tape (not shown). Playback processing section 392 processes the video signal read out from VCR tape and outputs a playback processed signal 394 in order to transmit the playback processed signal 394 to second video switching output section 310.

A video pre-amplifying section 400 allows the telerecording-processed signal 393 supplied from telerecording processing section 391 included in video processing section 390 to be telerecorded onto a video tape through a video head 410. Also, video pre-amplifying section 400 amplifies the video signal, read out from video tape via a video head 410, in order to output a video pre-amplified signal 401, and supplies the video pre-amplified signal 401 to playback processing section 392 which is included in video processing section 390.

An audio processing section 420 processes an audio signal of a video tape, reproduced via an audio head 421, in order to output a first audio processed signal 423 and applies the first audio processed signal 423 to first audio switching section 170, thereby allowing the audio signal, read out from video tape by the switching operation of first audio switching section 370, to be reproduced.

A second audio switching output section 440 inputs the audio signal from CDG disc 100, filtered by first and second low-pass filters 150 and 160, the television broadcasting signal (TV), and an audio signal (LINK) inputted via a second external terminal 470, via the respective input terminals, and switches input signals CDG, TV and LINK, in order to output a second audio switched output signal 441. A third mixing section 430 mixes the second audio switched output signal 441 supplied from second audio switching output section 440, second amplified signal 301 supplied from second amplifying section 300, and second audio-processed signal 422 supplied from audio processing section 420, in order to output a third mixed signal 431. A phonographing signal amplifying section 450 amplifies third mixed signal 431 supplied from third mixing section 430 in order to increase the audio level, and records the third mixed signal 431 onto a video tape.

A function control input section 490 inputs functions for controlling the operation of the composite apparatus, and is embodied either by a control panel disposed on the front plane of the composite apparatus of both a CDG player and a VCR according to the present invention, or by a remote control unit.

Control section 480 determines an apparatus corresponding to the functions set up from function control input section 490 to output function display control data, and collectively controls the overall functions of the composite apparatus of both a CDG player and a VCR.

Figure 2:
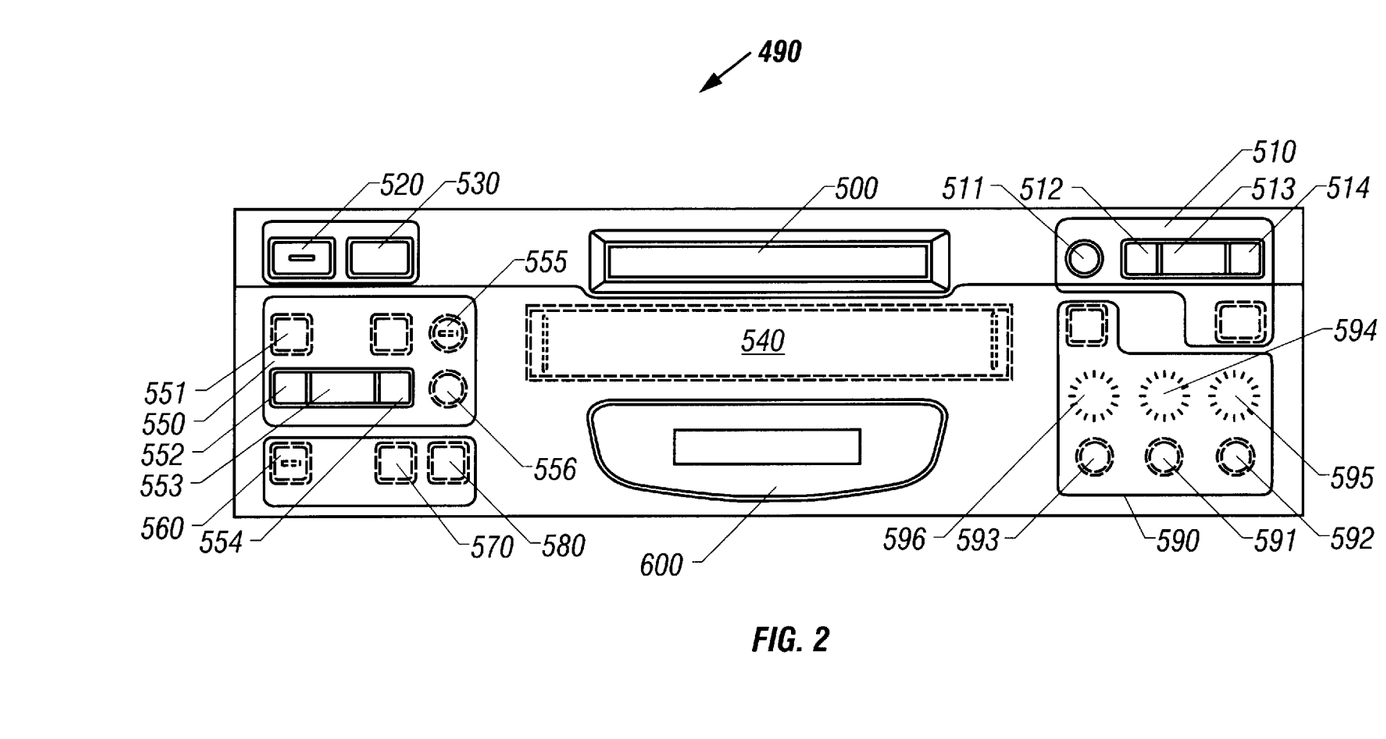
FIG. 2 illustrates the structure of a front control panel included in a function control input section shown in FIG. 1.

FIG. 2 illustrates the structure of a front control panel included in a function control input section shown in FIG. 1. As shown in FIG. 2, the front control panel in function control input section 490 includes an ejecting/loading-in aperture 500 for ejecting or loading CDG disc 100. Ejecting/loading-in aperture 500 is disposed in the upper central portion of the front control panel included in function control input section 490. Ejecting/loading-in aperture 500 is included in a disc tray (not shown). A first function button section 510 is disposed on the central portion of function control input section 490. First function button section 510 is supplied to a user to enable him/her to manipulate the playback operation of CDG player when CDG disk 100 is loaded. First function button section 510 includes a button 511 for controlling the ejecting/loading-in of the disc tray, a button 512 either for jumping over tracks to that amount of a song recorded on CDG disc 100 or for executing high-speed track feed of optical pickup device 120, a button 513 either for executing the playback operation or for momentarily pausing the playback operation, and a button 514 either for jumping over tracks backward or for moving over tracks backward in high speed, to that amount of a song for track designation of CDG disc 100. In the upper left portion of the front control panel in function control input section 490, there are aligned a power-supply switch 520 for switching over the power-supply of the composite apparatus between ON and OFF, and a remote control receiving section 530 for receiving a remote control signal from a remote control unit.

A video tape injecting aperture 540 for loading/unloading a video tape is disposed in the central portion of the front control panel in function control input section 490. A first function operating section 550, for reproducing the video tape, is disposed in the central portion of the left side of the front control panel in function control input section 490. First function operating section 550 includes a channel up/down button 551 for tuning broadcasting signals during a reserved photographing with a VCR; buttons 552, 553 and 554 for respectively executing high-speed winding, playback, and rewinding of the video tape; a recording button 555 for performing a recording operation; and a button 556 for either ejecting the video tape or stopping the playback.

The front control panel in function control input section 490 includes a button 560 for performing a synchronous recording operation in which recording the graphic information read out from a disc of CDG system of the composite apparatus of both a CDG player and a VCR is recorded; a button 570 for editing of video tape; and a button 580 for superimposing CDG data and external video signals. These buttons are aligned in the lower portion of the left side of the front control panel in function control input section 490.

A second function operating section 590 for practicing video-songs is disposed in the central and the lower portions of the right side of a front control panel in function control input section 490. Second function operating section 590 includes microphone jacks 591 and 592 for inputting a voice signal; a headphone jack 593 for connecting a headphone; a first and a second sound volume adjustor 594 and 595 for controlling the audio level of the voice signal applied to a microphone 260; and a third sound volume adjustor 596 for controlling the audio level of the voice signal outputted to a headphone.

Remote control unit has a button arrangement similar to that of the respective function manipulating buttons of above-mentioned front control panel so as to control the functions of the composite apparatus of both a CDG player and a VCR.

A fluorescent display panel section 600 is disposed in the lower portion of the central portion of the front control panel in function control input section 490.

Figure 3:
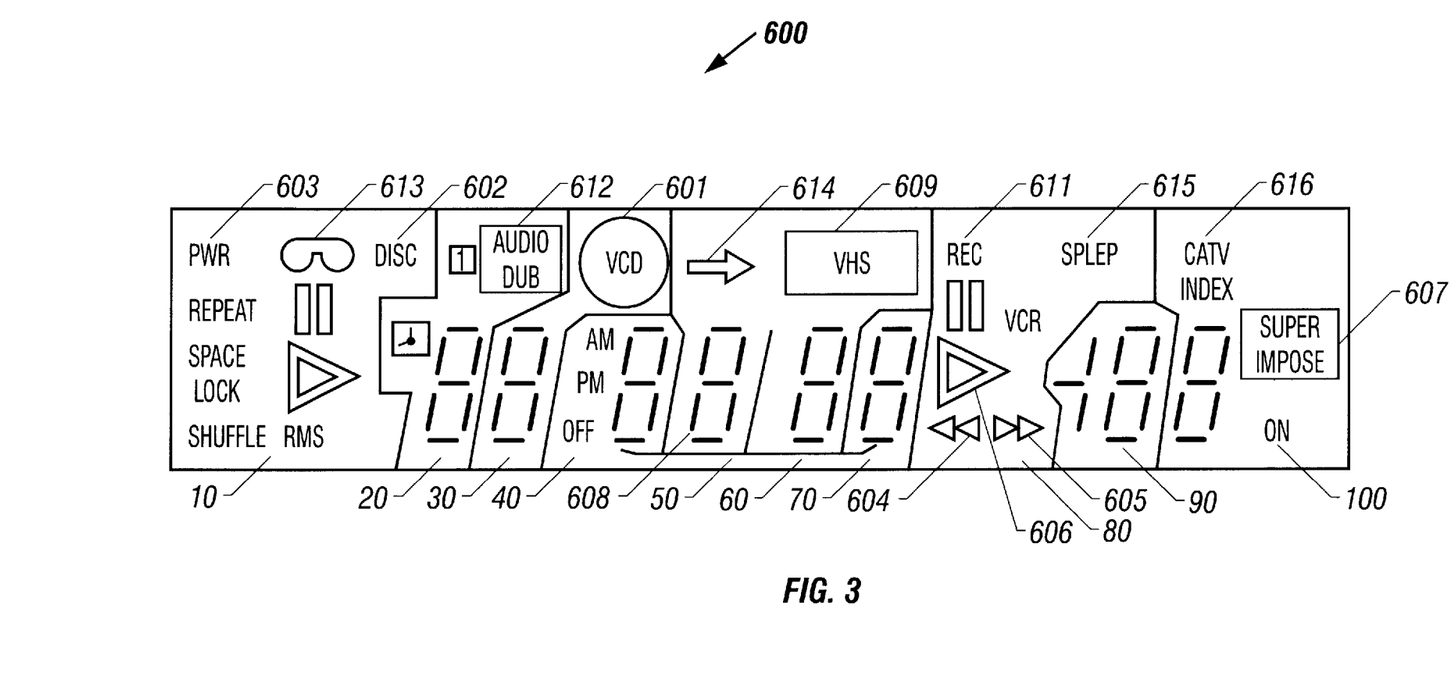
FIG. 3 illustrates the structure of a fluorescent display panel shown in FIG. 1.

FIG. 3 illustrates the structure of a fluorescent display panel shown in FIG. 1. As shown in FIG. 3, a fluorescent display panel section 600 displays the control state of a currently operated function in the composite apparatus of both a CDG player and a VCR. Fluorescent display panel section 600 is horizontally connected to a plurality of display sections 10, 20, 30, 40, 50, 60, 70, 80, 90 and 100, and usually has 11 control lines connected therewith (not shown). Therefore, when a control voltage is applied to control section 480, the corresponding display is driven to display the currently operated states of the composite apparatus according to the present invention, and thereby allows the user to visually recognize the currently operated states.

Figure 4:
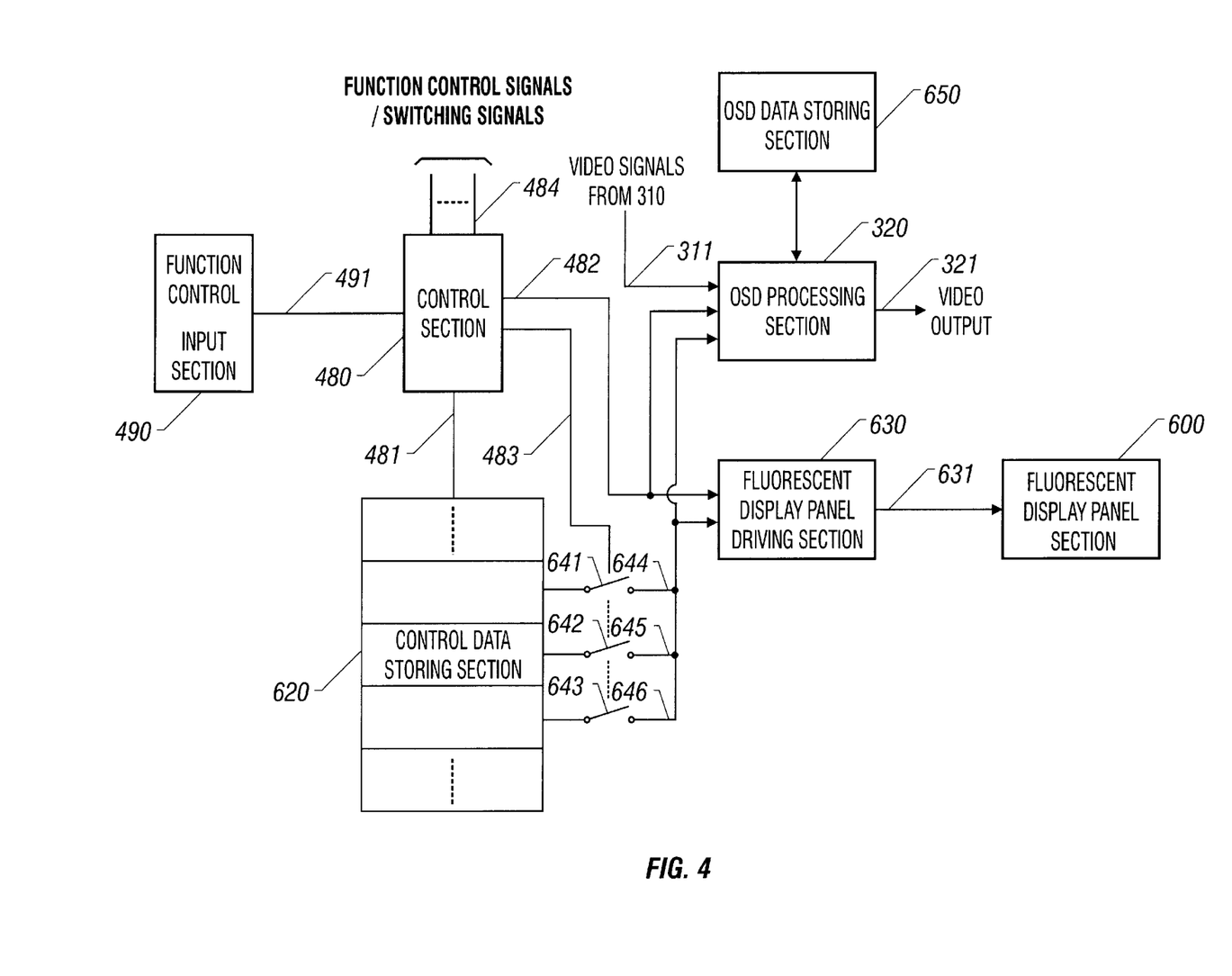
FIG. 4 is a block diagram showing the configuration of a function control input section according to the present invention.

FIG. 4 is a block diagram showing the configuration of a function control input section according to the present invention. As shown in FIG. 4, the function display controlling apparatus of the present invention includes a function control input section 490 for outputting a function control input signal 491 (playback and recording input signals) according to the user's manipulation of buttons on the front control panel in function control input section 490. Control section 480 determines an apparatus corresponding to the function control input signal 491 by function control input section 490 in order to output first, second and third control signals 481, 482 and 483, and function control signal/switching signal 484.

A control data storing section 620 inputs the first control signal 481, supplied from control section 480, and outputs exclusive function display data of a CDG player, common function display data of a CDG player and a VCR, and exclusive function display data of a VCR from corresponding data storing regions 621, 622 and 633. The exclusive function display data of a CDG player, the common function display data of both a CDG player and a VCR, and the exclusive function display data of a VCR, drive fluorescent display panel section 600.

A program switching section 640 is constituted by first, second and third program switches 641, 642 and 643. Program switching section 640 executes a switching operation, in accordance with a third control signal 483 supplied from control section 480, in order to form an output path for: the exclusive function display data of a CDG player, the common function display data of both a CDG player and a VCR, and the exclusive function display data of a VCR, which are stored in control data storing section 620. Program switching section 640 outputs first, second and third program switched signals 644, 645 and 646 corresponding to the three kinds of the function display data 621, 622 and 623.

An OSD data storing section 650 has OSD data stored therein. OSD data processing section 320 inputs one signal among first, second and third program switched signals 644, 645 and 646 supplied from program switching section 640, a second control signal 482 supplied from control section 480, and a video signal 311 supplied from second video switching output section 310 (see FIG. 1), and then outputs an OSD processed signal 321 which corresponds to a video output signal to a monitor (not shown).

A fluorescent display driving section 630 inputs one signal among first, second and third program switched signals 644, 645 and 646 supplied from program switching section 640, and a second control signal 484 supplied from control section 480, and then outputs a fluorescent display panel driving signal 631.

Fluorescent display panel section 600 (see FIG. 3) inputs the fluorescent display panel driving signal 631 supplied from fluorescent display driving section 630 and displays the currently operated function.

Figure 5:
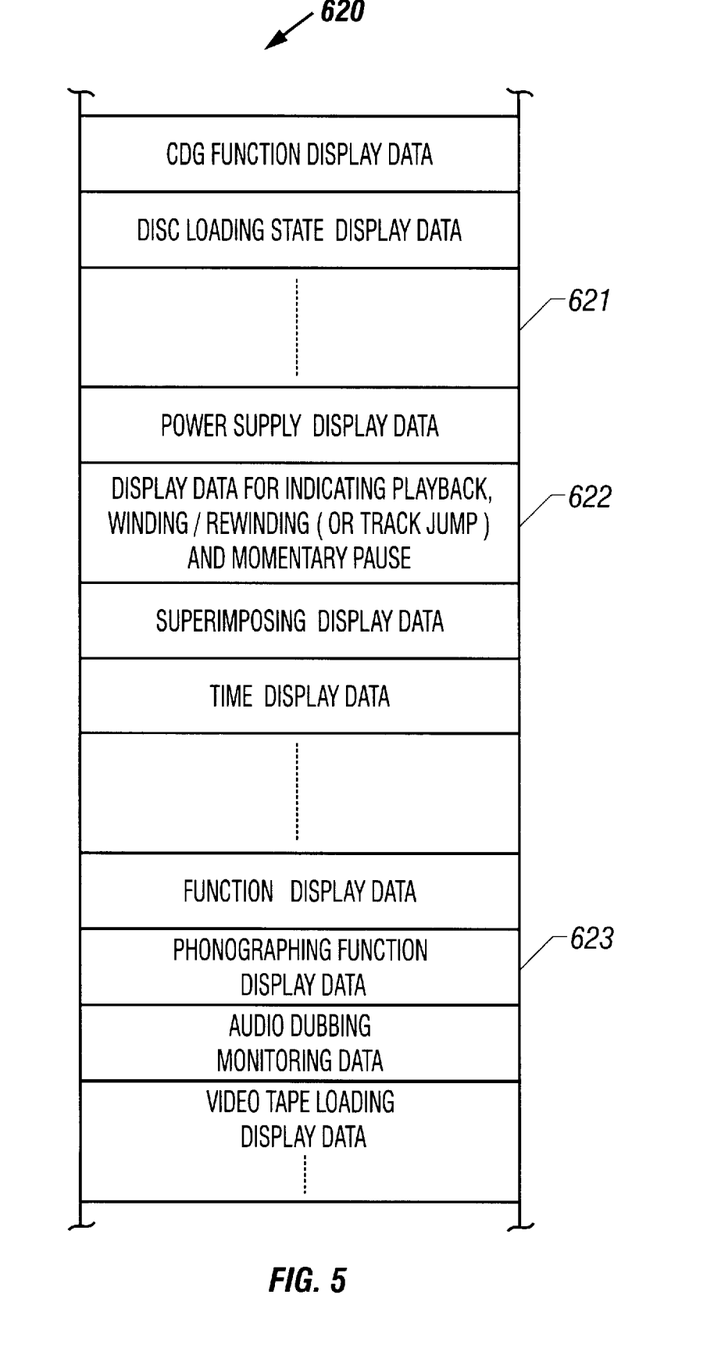
FIG. 5 is a schematic diagram for explaining a memory mapping of function display control data of a control data storing section shown in FIG. 4.

FIG. 5 is a schematic diagram for explaining a memory mapping of function display control data of a control data storing section shown in FIG. 4. As shown in FIG. 5, a memory region of control data storing section 620 is divided into a region 621 where an exclusive function display data of a CDG player in the composite apparatus is recorded, a region 622 where common function display data of both a CDG player and a VCR is recorded, and a region 623 where exclusive function display data of a VCR is recorded. As shown in FIGS. 3 and 5, the data for controlling a CDG function display 601 dedicated to a CDG player and the data for a disc loading state display 602 are stored in the data region 621 for controlling the exclusive function display of a CDG player. The data for a power-supply 'ON' display 603; the data for playback, winding/rewinding (or track jump), and momentary pause function displays 604 through 606 of CDG disc 100 or a video tape; data for function display 607 of superimposing the data from CDG disc and data television or external video signal; and the data for a time reservation function and current time display 608 during the playback of CDG disc 100 or video tape, are recorded in the data region 622 where the common function display data of both a CDG player and a VCR is recorded. The data for VCR function displays 609 and 610, the data for recording function display 611, the data for audio dubbing display 612, and the data for video tape loading display 613, are recorded in the region where the exclusive function display data of a VCR is recorded.

Hereinafter, the function display controlling method in the composite apparatus of both a CDG player and a VCR according to the present invention will be described.

First, when a power-supply 'ON' signal of the composite apparatus is inputted through function control input section 490, control section 480 reads out from control data storing section 620 the power-supply 'ON' display data 603, recorded in the data region 622 where the common function display data of both a CDG player and a VCR is recorded, and then applies the read data to fluorescent panel driving section 630. Accordingly, fluorescent panel driving section 630 drives and lightens the power-supply 'ON' display 603 (see FIG. 3). Thereafter, control section 480 waits until subsequent function input data is inputted by control function input section 490. If the function control input concerning a CDG player is received, the received function control input data is analyzed by a predetermined procedure. At this time, during the predetermined procedure, it is determined whether either a disc tray unloading/loading button 511 for unloading/loading disc tray, or buttons 512 and 514 for performing a track jump in a state in which CDG disc 100 is loaded, or button 513 for performing the playback operation, among the functions concerning CDG player, are manipulated or not. At this time, if one of the function buttons is manipulated, it is determined, with the predetermined procedure whether the manipulated function is either the exclusive function of a CDG player or the common function of both a CDG player and a VCR. Then, the desired function display data of the memory region is read out from control data storing section 620, and fluorescent display panel driving section 630 is driven, thereby executing the corresponding function displays on fluorescent display panel section 600. Also, the control data for performing the corresponding control operation is outputted, so that the audio and the video switching output sections 170, 250, 310, 370, 380 and 440 are switched in order to establish the path for a CDG playback signal and to execute the playback operation of a CDG player from CDG disc 100. Then, the corresponding control operation is performed. Accordingly, in a CDG player, digital signal processing section 130 processes RF signal 121 which is read out, by means of optical pickup device 120, from CDG disc 100 rotated at a constant speed by spindle motor 110 (see FIG. 1). The audio signal is converted into an analog signal, i.e., a data conversion signal 141 by data conversion section by means of data conversion section 140 and is outputted as an audio signal of the channels L and R. This audio signal sequentially passes through first and second low-pass filters 150 and 160, CDG signal path formed by first audio switching output section 170, first and second mixing sections 180 and 190, and first and second buffers 200 and 210. A second digital processed signal 132 corresponding to CDG code processed by digital signal processing section 130, is decoded by CDG decoder 220 and is outputted as decoded CDG data 221. The decoded CDG data 221 is encoded into a composite video signal (CDG+VCR) for a screen display by RGB encoder 240. The encoded composite video signal (CDG+VCR) passes through video switching output section 310 which is switched over to the CDG signal path, and OSD processing section 320 and is outputted as a video signal (a graphic signal).

Function changes during the playback operation of CDG disc 100, are performed under the control operation of control section 480. At this time, the display control of fluorescent display panel section 600 (FIG. 3) concerning the function changes are also performed. If the function changes are function exclusive to a CDG player, the function changes are performed in accordance with the control data stored in the data region 621 for controlling the exclusive function display of CDG player of control data storing section 620. If functions inputted from function control input section 490 are the exclusive function of a VCR, the display control data corresponding to the exclusive function of a VCR is read out from the data region 623 for controlling the exclusive function of a VCR display of control data storing section 620, under the control operation of control section 480, so that the exclusive functions of a VCR are displayed on fluorescent display panel section 600. In this state, if the functions concerning the playback of a video tape for a VCR are selected, control section 480 supplies the control signals for the playback operation from the video tape to the respective audio and video switching output sections 170, 250, 310, 380 and 440 in order to form a path concerning audio and video signals for the playback operation using a VCR. Accordingly, the video signal read out from the video tape by video head 410 is presented by video pre-amplifying section 400 and video processing section 392 and is outputted as a video signal via video switching output section 310 in which the signal path is switched over to a VCR, and OSD processing section 320. In contrast, the audio signal read out from the video tape by audio head 421 is processed via audio processing section 420, via first audio switching section 170, via first and second mixing sections 180, and via 190 and first and second buffers 200 and 210 and is outputted as an audio signal.

When, during the playback operation, either the pause, or the winding or rewinding, or the ejecting function is inputted from function control input section 490, control section 480 determines whether or not the inputted function is a function which can be commonly displayed with CDG player. If it is determined that the function can be commonly displayed, the corresponding display control data is read out from the region 622 of control data storing section 620 where the common function display data of both a CDG player and VCR is recorded, under the control operation of control section 480, and the corresponding functions are displayed on fluorescent display panel section 600.

In the case where the audio signal and video signal read out from CDG disc 100 by a CDG player are recorded onto the video tape by a VCR, or when line video and audio signals inputted through first and second external input terminals 460 and 470 are recorded onto a video tape, if the corresponding functions are inputted by function control input section 490, then control section 480 controls the switching mode of audio and video switching output sections 170, 250, 310, 370, 380 and 440 so that the corresponding functions are executed. In other words, if the audio signal and graphic signal read out from CDG disc 100 by CDG player are recorded onto the video tape, the audio signal is processed while being passed through third mixing section 430 and phonographing signal amplifying section 450 by the switching operation of audio switching section 440. The phonographing signal amplified signal 451 supplied from phonographing signal amplifying section 450 is applied to audio head 421 and is then recorded onto the video tape. The graphic signal read out from CDG disc 100 is supplied to telerecording processing section 391 included in video processing section 390 by the switching operations of first video switching output section 250, third video switching output section 370 and fourth video switching output section 380. The telerecording processed signal 393 supplied from telerecording processing section 391 is applied to video pre-amplifying section 400 and video head 410 and is then recorded onto the video tape.

The recording operation in which a television broadcasting signal is recorded onto the video tape in accordance with the VCR reservation function, will be described as follows. After a channel and a reserved recording time are inputted by function control input section 490, control section 480 stores the inputted channel and reserved recording time in a random access memory (RAM) and recognizes the inputs as the common function of both a CDG player and a VCR, and sends a control signal to control data storing section 620 so that time display data is read out from the region 622 of control data storing section 620 where the common function display data of both a CDG player and a VCR is recorded. After the time display data is read out, the time indicated by a soft timer (not shown) is displayed on a time display 608 of fluorescent display panel section 600. In this state, when the reserved recording time arrives, the tuning voltage is supplied to tuning section 350, and causes the tuning operation for tuning the reserved channel to be performed. The tuned signal (tuned broadcasting signal) 351 supplied from tuning section 350, is inputted to IF modulating section 360. IF modulating section 360 IF-modulates the tuned signal 351 to output first and second IF-modulated signals 361 and 362. By the switching operation of fourth video switching output section 380, the first IF-modulated signal 361 is applied to telerecording processing section 391 included in video processing section 390 under the control operation of control section 480 and is outputted as the telerecording-processed signal 393 which is suitable to be recorded. The telerecording-processed signal 393 supplied from telerecording processing section 391, is amplified by video pre-amplifying section 400. The amplified video signal is applied to video head 410 and is then recorded onto the video tape. The second IF-modulated signal (audio signal) 362 is inputted to third mixing section 430 by the switching operation of second audio switching output section 440 and is outputted as the third mixed signal 431. In order to be amplified, the third mixed signal 431 is inputted to phonographing signal amplifying section 450, and the amplified audio signal is applied to audio head 421 in order to be recorded on the video tape.

The playback operation of a video screen and accompaniment music using a CDG player and a VCR in order to practice video-songs, will be described as follows. The singer's singing voice signal inputted through microphone 260 passes through third low-pass filter 270, first amplifying section 280, echo processing section 290, and second amplifying section 300 and is applied to first and second mixing sections 180 and 190 in order to be mixed with the audio signal read out from CDG disc 100 by CDG player. The mixed singer's singing voice signal and the audio signal read out from CDG disc 100 are buffered by first and second buffers 200 and 210 and are respectively outputted as first and second buffer signals 201 and 211. First and second buffer signals 201 and 211 are outputted as the audio signals of the channels L and R.

The operation in which the singer's singing voice signal is recorded onto the video tape, will be described as follows. The singer's singing voice signal is inputted into microphone 160 and the voice signal passed through microphone 160 is processed via third low-pass filter 270 and via first amplifying section 280. First amplifying section 280 applies first amplified signal 280 to second amplifying section 300. The first amplified signal 280 is amplified by second amplifying section 300 and is outputted as the second amplified signal 301. The second amplified signal 301 is applied to audio head 421 via third mixing section 430 and via phonographing signal amplifying section 450 and is recorded onto the video tape. At this time, the background picture displayed on the screen of a monitor is also recorded onto the video tape. In other words, the graphic signal read out from CDG disc 100 under the control operation of control section 480 is processed by playback processing section 392 included in video processing section 390 and is applied to video head 410 in order to be recorded onto the video tape. In contrast, the television broadcasting video signal supplied from IF modulating section 360 can be displayed as the background picture of a monitor. In other words, the television broadcasting video signal is processed via fourth video switching output section 380 and via telerecording processing section 391 included in video processing section 390, under the control operation of control section 480. Telerecording processing section 391 then outputs the telerecording-processed signal 393. The telerecording-processed signal 393 is applied to video head 410 and is recorded onto the video tape. When a video signal either of the graphic signal or of television broadcasting signal is recorded onto the video tape under the control operation of control section 480, the exclusive recording display data of a VCR is read out from the region 622 of control data storing section 620 where the common function display data of both a CDG player and a VCR is recorded and REC display portion 611 of fluorescent display panel section 600 is lightened. Also, it is possible to record the audio signal and video signal which are respectively inputted through first and second external input terminals 460 and 470 onto the video tape, under the control operation of control section 480.

According to the present invention, the required display control data among the exclusive function of CDG player, the common function of both a CDG player and a VCR, the exclusive function of a CDG player, is read out from separate memory regions included in control data storing section 620, in accordance with the function control inputs that a user inputs by function control input section 490 concerning, so that the functions selected or currently executed in the composite apparatus of a CDG player and a VCR are displayed on fluorescent display panel section 600.

Therefore, first, it is possible to simplify fluorescent display panels in the composite apparatus of both a CDG player and a VCR. Secondly, it is possible to make clear at a glance the display of the functions currently operated. Thirdly, it is possible to make it easier for the user to figure out the current operation state upon viewing the fluorescent display panel section.

As described above, although illustrative embodiments of the present invention have been described in detail herein, it is to be understood that the invention is not limited to those precise embodiments, and that various changes and modifications may be effected therein by one skilled in the art without departing from the scope or spirit of the invention.

What is claimed is:

1. An apparatus for controlling function displays in a combined device of a compact disc graphics player and a video cassette recorder, said apparatus comprising:

a function control inputting section for outputting function control input signals which are playing, and for inputting signals by operating operator's buttons through a front control panel of the function control inputting section;

a controlling section for outputting a first, a second and a third signals, and a function control signal/switching signal by judging a corresponding playing device to the function control input signals provided by said function control inputting portion;

a compact disc graphics player for outputting a composite image on a monitor and for reproducing an audio signal by reading out data recorded on a compact disc graphics through a light controlled by the control section in response to an input signal for reproducing a compact disc graphics, the input signal being provided by said function control inputting section;

a video cassette recorder either for reproducing the audio signal while outputting a composite image signal on the monitor by reading out video/audio data recorded on a video tape under the control of said controlling section in response to signals for VCR playing and recording inputting signals provided by said function control input section, or for recording either television image signals from a tuning section or composite image signals inputted from external inputting terminals on the video tape;

a control data storing section for storing a first, a second and a third function display data which are read by the first control signal provided by said control section;

a program switching section for forming output paths of first exclusive function display data exclusively used by said compact disc graphics player, second common function display data commonly used both by said compact disc graphics player and by said video cassette recorder, and third function display data exclusively used by the video cassette recorder, which are stored in said control data storing section by the third control signal from said control section, and for outputting a first, a second and a third program switching signals corresponding to each of said function display data, said program switching section including a first, a second and a third program switches;

an on screen-display data storing section for storing on-screen-display data;

an on-screen-display processing section for outputting an on-screen-display processing signal as a video outputting signal on a monitor by inputting a first signal among the first, the second and the third program switching signals from said program switching section, the second control signal from said control section and a video signal from a video switching outputting section;

a fluorescent display panel driving section for outputting a fluorescent display panel driving signal by inputting a second signal among said first, said second and said third program switching signals from said program switching section and the second control signal from said control portion; and a fluorescent display panel section for displaying presently operating functions by inputting the fluorescent display panel driving signal from said fluorescent display panel driving section.

2. The apparatus for controlling function displays in a combined device of a compact disc graphics player and a video cassette recorder as claimed in claim 1, wherein said control data storing section portion comprises: a first region wherein the first function display data exclusively used by said compact disc graphics player are recorded; a second region wherein the second common function display data commonly used by both said compact disc graphics player and said video cassette recorder are recorded; and a third region wherein the third function display data exclusively used by said video cassette recorder are recorded.

3. The apparatus for controlling function displays in a combined device of a compact disc graphics player and a video cassette recorder as claimed in claim 2, wherein said program switching section is connected with; the first region wherein the first function display data exclusively used by said compact disc graphics player are recorded; the second region wherein the second common function display data commonly used by said compact disc graphics player and said video cassette recorder are recorded; and the third region wherein the third function display data exclusively used by said video cassette recorder are recorded.

4. The apparatus for controlling function displays in a combined device of a compact disc graphics player and a video cassette recorder as claimed in claim 1, wherein a front display panel of said fluorescent display panel section comprises:

an 'on' display portion of a power 'on', a video tape loading display portion, a disc loading state display portion, an audio dubbing display portion, a compact disc graphics function display portion, an information recording medium direction display portion, a video cassette recorder function display portion, a recording display portion, a SPLEP display portion and a CATV display portion which are all disposed sequentially on an upper portion of said fluorescent display panel from left to right;

a repetition display portion, a space display portion, a 'lock' display portion, a shuttle display portion and an RMS display portion which are all disposed below the power display portion and the video tape loading state display portion, but disposed sequentially from up to down;

two first sets of seven segments for displaying two numbers, which are disposed below both the disc loading state display portion and the audio dubbing display portion;

a time display portion for displaying either a playing time of a compact disc graphics disc or a time reservation function of the video cassette recorder and a present time, which is disposed under the compact disc graphics display portion, under the information recording medium direction display portion and under the video cassette function display portion;

a video cassette recorder function display portion, a temporary pause display portion, a play display portion and a winding/rewinding display portion of the compact disc graphics disc or of the video tape, which are all disposed sequentially under the recording function display portion and under the SPLEP display portion from up to down; and an INDEX display portion, a double printing display portion, two second sets of seven segments for displaying two numbers and an 'ON' display portion, which are all disposed sequentially below the SPLEP display portion and the CATV display portion from up to down.

* * * * *